(12) United States Patent
Watanabe et al.

(10) Patent No.: US 11,661,106 B2
(45) Date of Patent: May 30, 2023

(54) STEERING SYSTEM

(71) Applicant: JTEKT CORPORATION, Osaka (JP)

(72) Inventors: Takeshi Watanabe, Kashihara (JP); Yasuyuki Nozawa, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 142 days.

(21) Appl. No.: 17/145,543

(22) Filed: Jan. 11, 2021

(65) Prior Publication Data
US 2021/0214003 A1    Jul. 15, 2021

(30) Foreign Application Priority Data

Jan. 15, 2020   (JP) .............................. JP2020-004107

(51) Int. Cl.
| | | |
|---|---|---|
| *B62D 6/00* | (2006.01) | |
| *B62D 5/00* | (2006.01) | |
| *B62D 1/183* | (2006.01) | |
| *B62D 1/181* | (2006.01) | |
| *B62D 1/185* | (2006.01) | |
| *B62D 5/04* | (2006.01) | |

(52) U.S. Cl.
CPC ............. *B62D 6/008* (2013.01); *B62D 5/006* (2013.01)

(58) Field of Classification Search
None
See application file for complete search history.

(56) References Cited

U.S. PATENT DOCUMENTS

| | | | | |
|---|---|---|---|---|
| 2011/0153160 | A1* | 6/2011 | Hesseling | B62D 5/006 |
| | | | | 701/1 |
| 2016/0368522 | A1* | 12/2016 | Lubischer | B62D 1/105 |
| 2019/0002010 | A1 | 1/2019 | Cao et al. | |
| 2019/0118852 | A1 | 4/2019 | Suzuki et al. | |

FOREIGN PATENT DOCUMENTS

| | | |
|---|---|---|
| DE | 10 2018 115 720 A1 | 1/2019 |
| EP | 3 564 093 A1 | 11/2019 |
| JP | 2019-077354 A | 5/2019 |

OTHER PUBLICATIONS

Jun. 14, 2021 extended Search Report issued in European Patent Application No. 21151326.2.

* cited by examiner

*Primary Examiner* — Adam D Tissot
*Assistant Examiner* — Laura E Linhardt
(74) *Attorney, Agent, or Firm* — Oliff PLC

(57) ABSTRACT

A steering system includes a rotary shaft to which an operation member is coupled; a first actuator; a second actuator; a control unit; and a moving unit configured to move the operation member between a normal position and a storage area. The control unit is configured to switch between a manual drive mode and an autonomous drive mode. The control unit is configured to, when moving the operation member from the storage area to the normal position, start synchronous control when the operation member satisfies a predetermined condition before the operation member reaches the normal position, the synchronous control being control in which the control unit controls the first actuator to change a rotation angle of the rotary shaft to an angle corresponding to a steered angle of steered wheels driven by the second actuator.

5 Claims, 8 Drawing Sheets

FIG. 6A
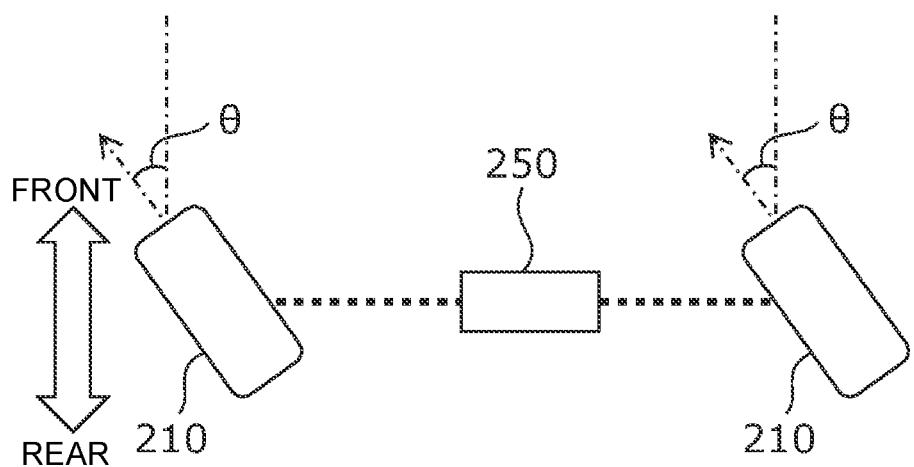
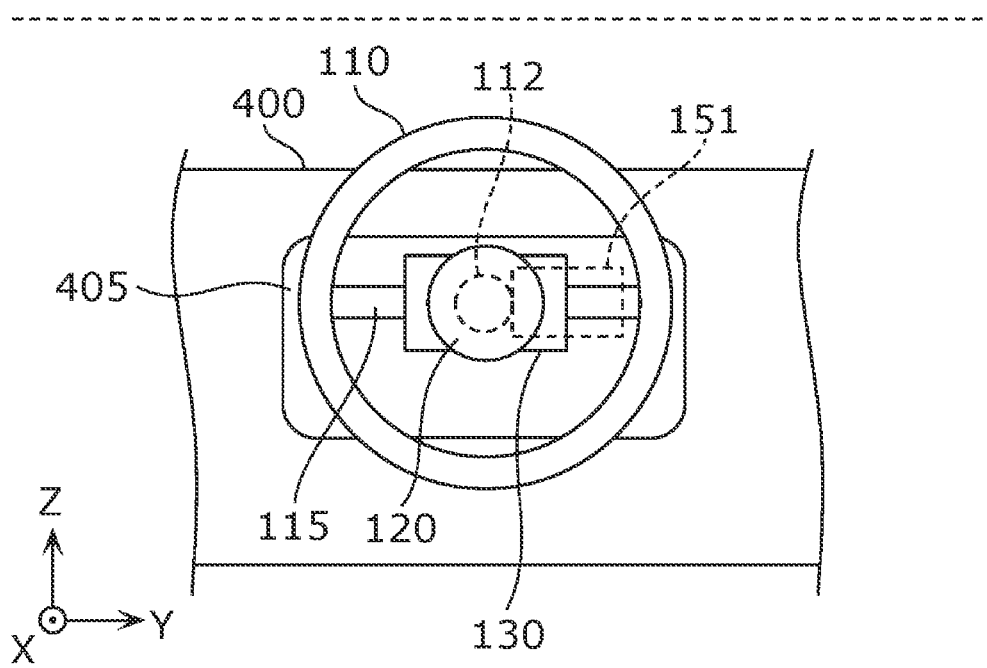

FIG. 6B
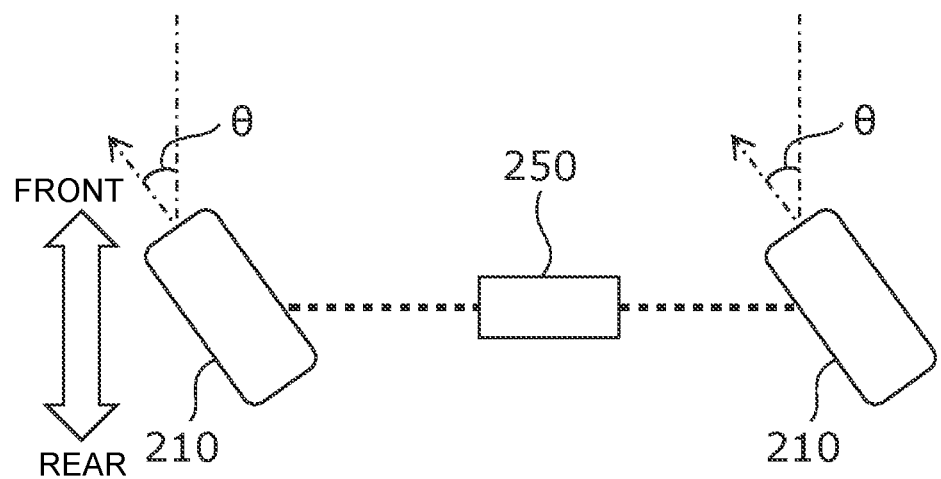
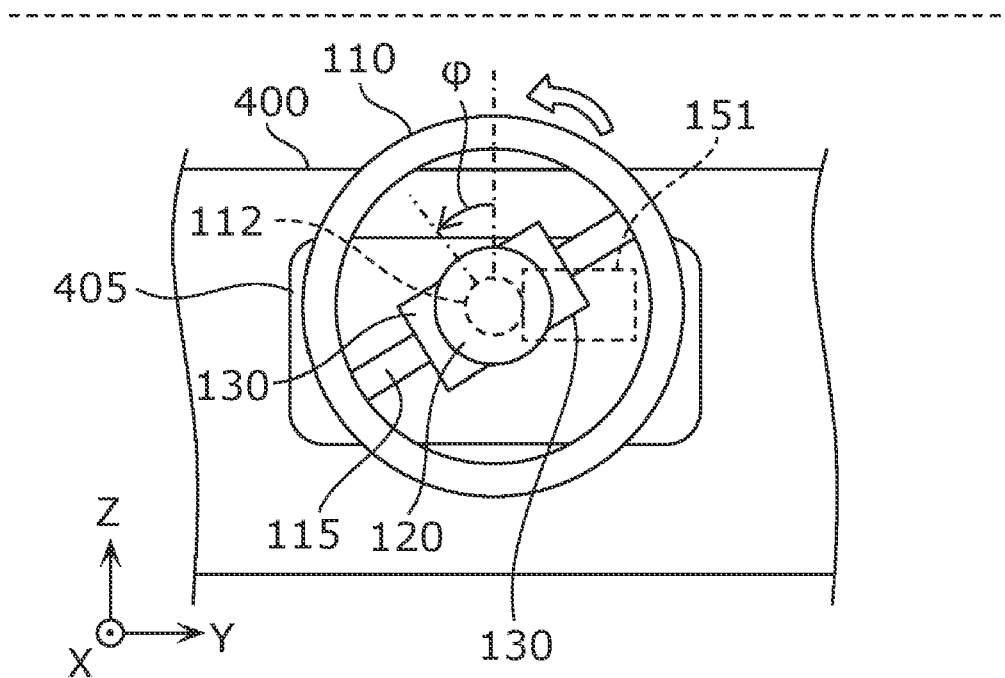

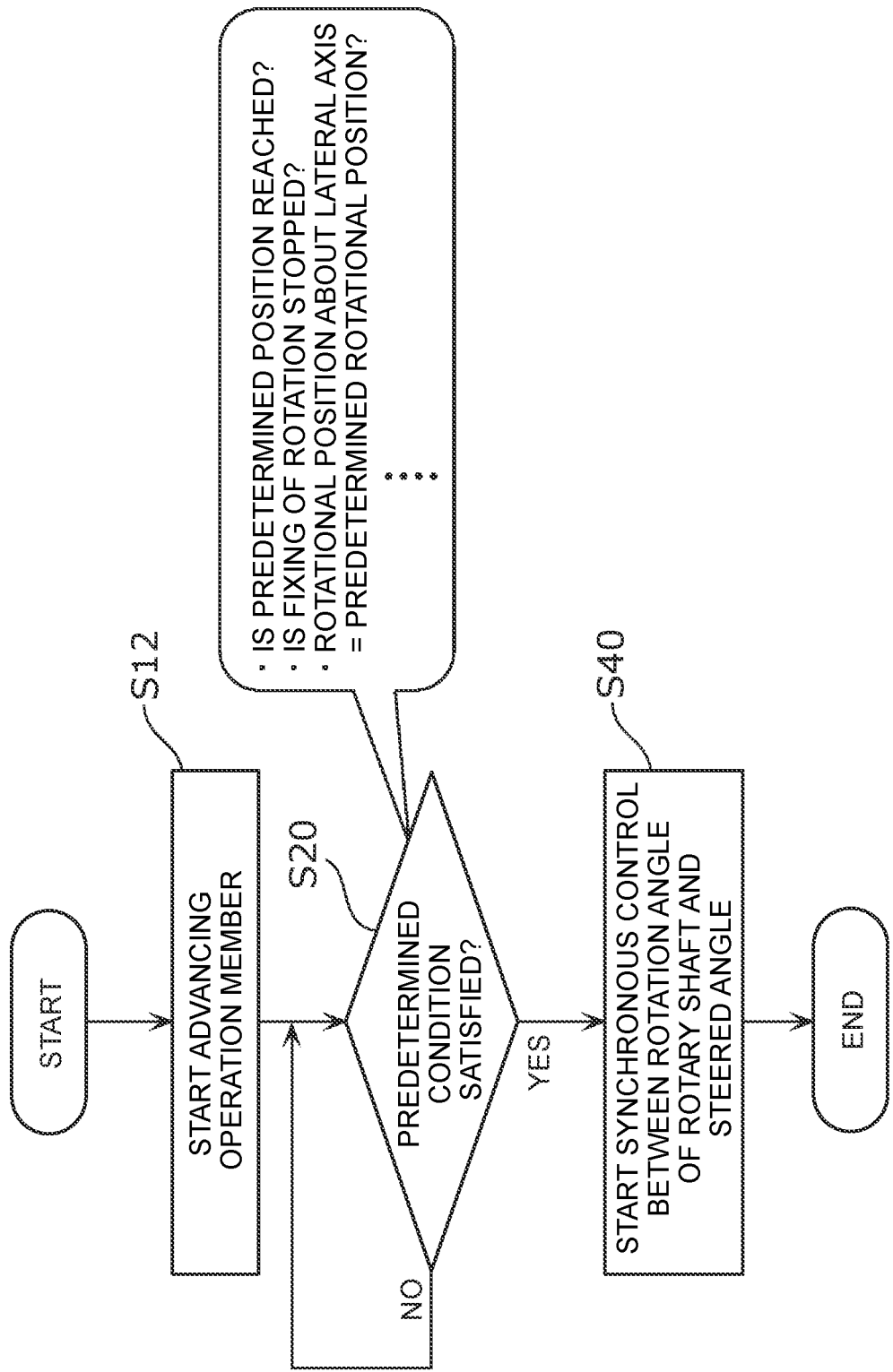

STEERING SYSTEM

CROSS-REFERENCE TO RELATED APPLICATION

This application claims priority to Japanese Patent Application No. 2020-004107 filed on Jan. 15, 2020, incorporated herein by reference in its entirety.

BACKGROUND

1. Technical Field

The disclosure relates to a steering system capable of increasing the space in front of a driver by moving an operation member such as a steering wheel.

2. Description of Related Art

At autonomous driving level 3 or higher at which a system is responsible for autonomous driving of a vehicle, a driver need not be responsible for the operation of the vehicle and therefore need not hold a steering wheel. Accordingly, driver's comfort is increased if the steering wheel is moved to create a large space in front of the driver during autonomous driving. For example, Japanese Unexamined Patent Application Publication No. 2019-77354 (JP 2019-77354 A) discloses a vehicle operation system capable of moving a driving operator that is a steering wheel. This vehicle operation system includes the driving operator that accepts an operation performed by an occupant and a control unit that controls a holding mechanism for the driving operator so that the driving operator is stored by changing the state of the holding mechanism based on the state of autonomous driving that is performed in a vehicle.

SUMMARY

In a steering system that moves a steering wheel (operation member) such as the vehicle operation system in the related art, for example, the operation member is moved between a position where the operation member is operated by the driver (normal position) and a storage area located ahead of the normal position. That is, when the driver does not need to operate the operation member, for example, while the vehicle is traveling in an autonomous drive mode, the operation member is stored ("retracted") in the storage area. For example, the storage area is provided inside a vehicle member such as a dashboard in front of the driver's seat in order to suppress interference between the operation member and the driver. In this case, the rotational position of the operation member stored in the storage area is fixed so that the operation member and members that are moved and rotated together with the operation member are not rotated in the storage area. This is to suppress interference between, e.g., a wall of the storage area and stored objects including the operation member.

As described above, when the operation member is stored in the storage area, damage or abnormal noise of the operation member, etc. due to interference with other member is suppressed by not synchronizing the steered angle of steered wheels of the vehicle that is traveling in the autonomous drive mode and the rotational position of the operation member. In this case, however, when the operation member stored in the storage area is advanced to the normal position to start or resume a manual drive mode, it is very likely that the rotational position of the operation member at that time does not correspond to the steered angle of the steered wheels at that time. Accordingly, the driver who operates the operation member advanced to the normal position may feel uncomfortable operating the operation member. This discomfort the driver feels when starting to operate the operation member can be reduced by performing synchronous control, namely control in which the operation member advanced to the normal position is adjusted to the rotational position corresponding to the steered angle of the steered wheels. In this case, however, the driver who intends to manually drive the vehicle needs to wait for a long time.

The disclosure provides a steering system capable of increasing the space in front of a driver and efficiently switching to manual driving.

An aspect of the disclosure relates to a steering system configured to steer a vehicle. The steering system includes a rotary shaft to which an operation member is coupled; a first actuator configured to apply a driving force for rotating the rotary shaft to the rotary shaft; a second actuator configured to apply a driving force for steering to steered wheels that are not mechanically coupled to the rotary shaft, the steered wheels being included in the vehicle; a control unit configured to control operation of the steering system; and a moving unit configured to move the operation member between a normal position that is a position where the operation member is operated by a driver, and a storage area located ahead of the normal position. The control unit is configured to switch between a manual drive mode and an autonomous drive mode. The manual drive mode is a mode in which the control unit drives the second actuator based on operation of the operation member by the driver when the operation member is not in the storage area, and the autonomous drive mode is a mode in which the control unit drives the second actuator based on an instruction that is generated without depending on the operation of the operation member by the driver. The control unit is configured to, when moving the operation member from the storage area to the normal position, start synchronous control when the operation member satisfies a predetermined condition before the operation member reaches the normal position. The synchronous control is control in which the control unit controls the first actuator to change a rotation angle of the rotary shaft to an angle corresponding to a steered angle of the steered wheels driven by the second actuator.

According to the above aspect of the disclosure, the steering system is provided which is capable of increasing the space in front of the driver and efficiently switching to manual driving.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A illustrates the operation member according to the embodiment whose rotational position does not correspond to the steered angle of steered wheels;

FIG. 6B illustrates the operation member according to the embodiment whose rotational position corresponds to the steered angle of the steered wheels;

FIG. 7 is a flowchart illustrating a basic operation flow of the steering system according to the embodiment;

DETAILED DESCRIPTION OF EMBODIMENTS

Figure 1:
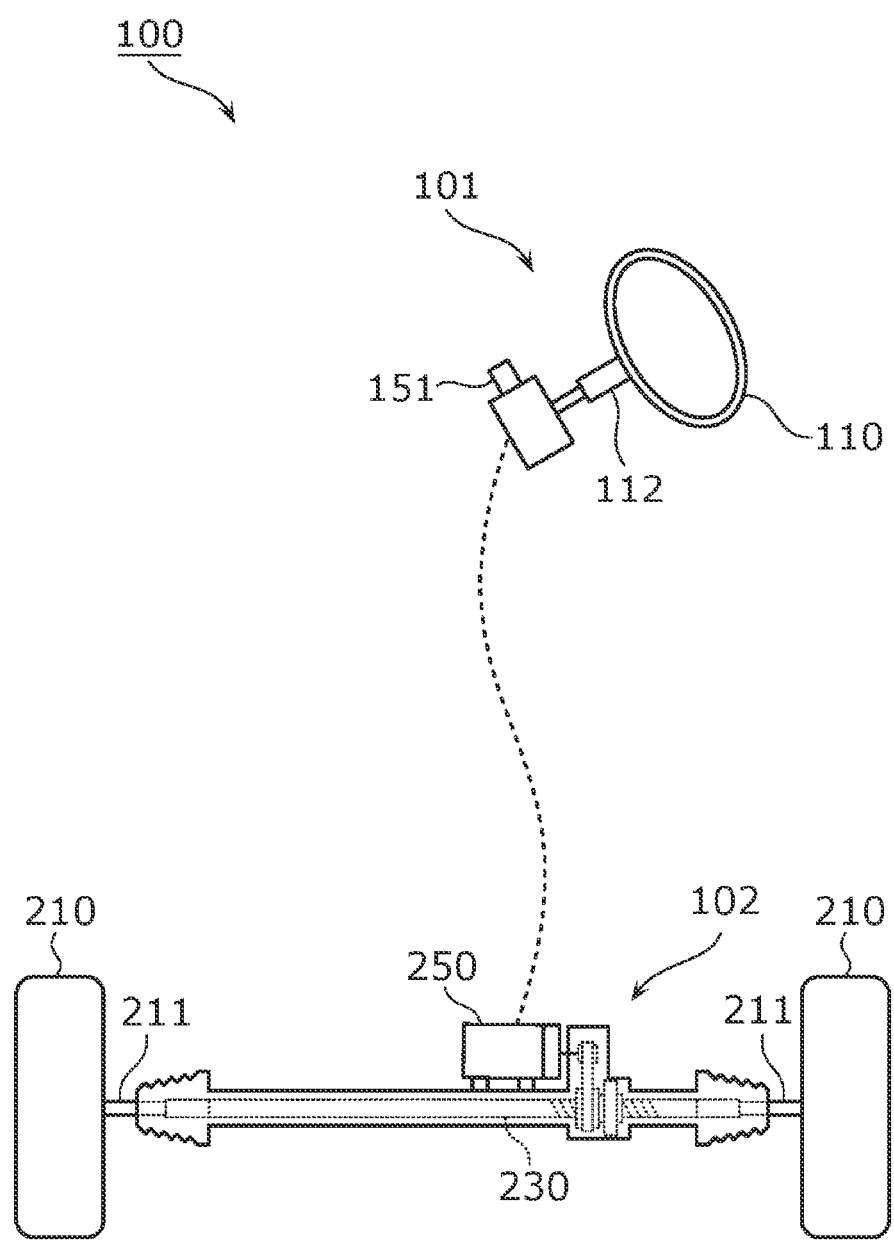
FIG. 1 illustrates a schematic configuration of a steering system according to an embodiment.

Embodiments of a steering system according to the disclosure will be specifically described with reference to the accompanying drawings. The embodiments described below illustrate comprehensive or specific examples. The numerical values, shapes, materials, components, positions and connections of the components, steps, order of steps, etc. shown in the following embodiments are merely examples and are not intended to limit the disclosure.

The drawings are schematic views with components being emphasized, omitted, or adjusted in proportion as appropriate in order to illustrate the disclosure, and the shapes, positional relationships, and proportions in the drawings may be different from the actual shapes, positional relationships, and proportions. In the following embodiments, expressions indicating relative directions or attitudes such as parallel and perpendicular are sometimes used. These expressions include the case where the relative directions or attitudes are not exactly the indicated directions or attitudes. For example, two directions being parallel not only means that the two directions are exactly parallel, but also means that the two directions are substantially parallel, that is, the two directions are nearly parallel within, e.g., about several percent differences.

Embodiment

1. Mechanical Configuration of Steering System

Figure 2:
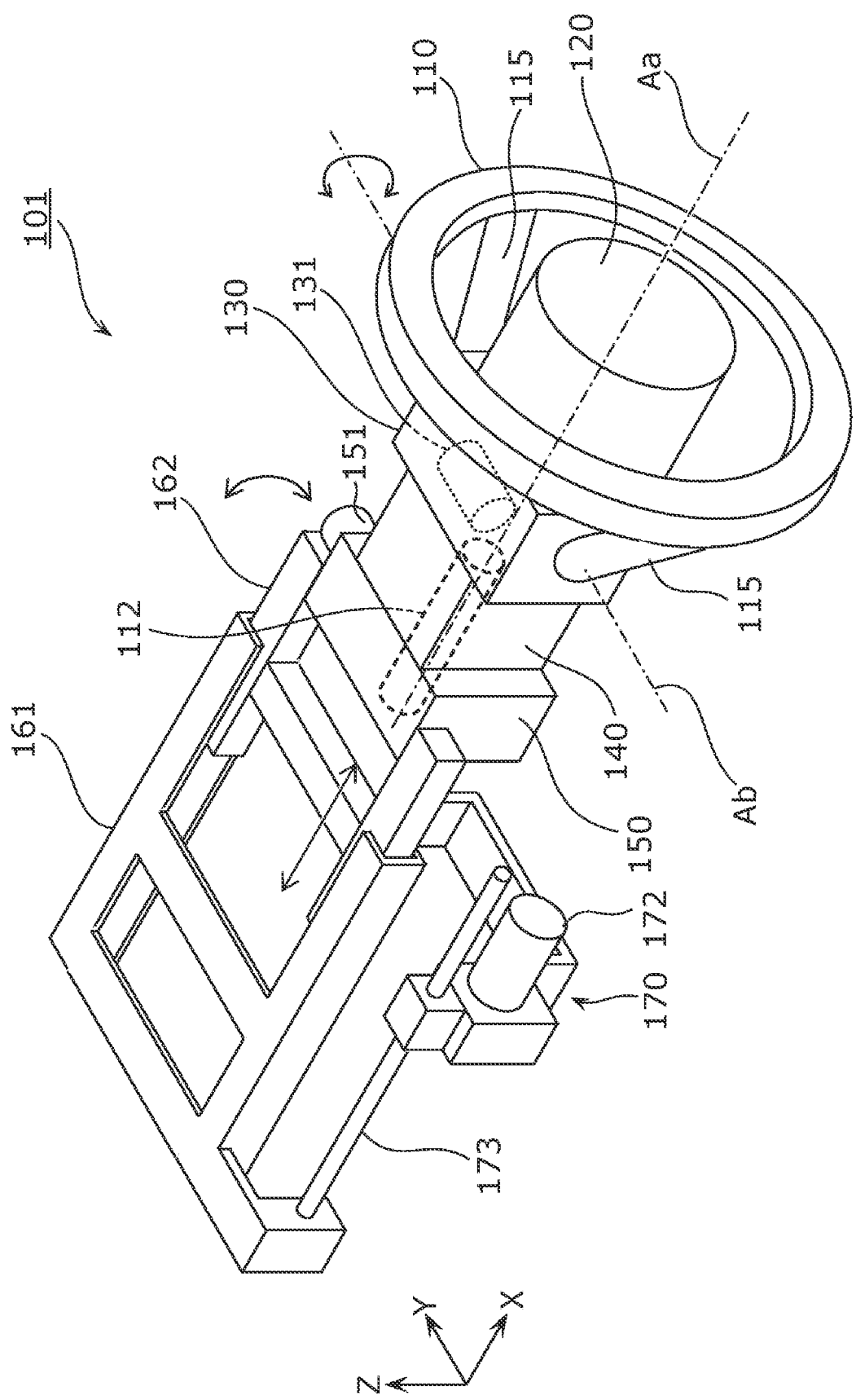
FIG. 2 is a perspective view illustrating the appearance of a steering mechanism unit included in the steering system according to the embodiment.

FIG. 1 illustrates a schematic configuration of a steering system 100 according to an embodiment. FIG. 2 is a perspective view illustrating the appearance of a steering mechanism unit 101 included in the steering system 100 according to the embodiment.

The steering system 100 according to the embodiment is a system that is mounted on vehicles such as passenger vehicles, buses, trucks, construction equipment, or agricultural machines capable of switching between a manual drive mode and an autonomous drive mode.

As shown in FIG. 1, the steering system 100 includes the steering mechanism unit 101 including an operation member 110 that is operated by a driver, and a steering operation mechanism unit 102 that steers steered wheels 210. The steering system 100 is a so-called steer-by-wire (SBW) system in which the rotation angle, etc. of the operation member 110 are read with a sensor, etc. and the steered wheels 210 are steered by a shaft 230 reciprocating in the lateral direction of the vehicle (right-left direction in FIG. 1) based on signals from the sensor, etc. in the manual drive mode, for example.

In the steering mechanism unit 101 located upstream in such operations and processes related to steering of the vehicle, a rotary shaft 112 is coupled to the operation member 110, and the rotary shaft 112 is configured to receive a rotational driving force of a first actuator 151. The operation member 110 is subjected to a reaction force by the rotational driving force of the first actuator 151 when the driver operates the operation member 110. The rotational driving force of the first actuator 151 is also used to synchronize the rotational position of the operation member 110 with the steered angle of the steered wheels 210. An example of operation control using the first actuator 151 will be described later with reference to FIG. 7, etc.

In the steering operation mechanism unit 102 located downstream of the steering mechanism unit 101, the steered wheels 210 connected to the shaft 230 via tie rods 211 are steered when the shaft 230 moves in the lateral direction (width direction) of the vehicle (i.e., right-left direction in FIG. 1). Specifically, in the manual drive mode, a second actuator 250 operates based on signals indicating the rotation angle, etc. of the operation member 110 that are sent from the steering mechanism unit 101. As a result, the shaft 230 moves in the lateral direction of the vehicle, and the steered wheels 210 are steered accordingly. That is, the steered wheels 210 are steered according to the operation of the operation member 110. In the autonomous drive mode, the second actuator 250 operates based on signals, etc. that are sent from a computer (not shown) for autonomous driving mounted on the vehicle. The steered wheels 210 are thus steered without depending on the operation of the operation member 110.

More specifically, in the steering system 100 configured as described above, the steering mechanism unit 101 includes support members 115 that support the operation member 110 and a rotation mechanism unit 130, as shown in FIG. 2. For example, in the embodiment, the operation member 110 is a member corresponding to a rim of a steering wheel, and the support members 115 are members corresponding to spokes of the steering wheel.

The operation member 110 is rotated about a steering axis Aa (imaginary axis extending in the longitudinal direction of the vehicle, the imaginary axis extending in parallel with the X axis in the embodiment) when operated by the driver, and the rotary shaft 112 coupled to the operation member 110 is also rotated about the steering axis Aa accordingly. In the manual drive mode, the one or more steered wheels 210 of the vehicle are steered as described above based on the amount of this rotation, etc.

The operation member 110 is supported by the support members 115 extending from the rotation mechanism unit 130. For example, the support members 115 are respectively located on both sides in the vehicle lateral direction (Y-axis direction in the embodiment) of the rotation mechanism unit 130 when the steered wheels 210 are in a neutral state, namely in a straight ahead state where the steered wheels 210 face the straight ahead direction. When the operation member 110 is rotated about the steering axis Aa, the rotation mechanism unit 130 is also rotated about the steering axis Aa accordingly. The rotary shaft 112 with its one end fixed to the rotation mechanism unit 130 is also rotated with the rotation of the operation member 110. That is, in the embodiment, the rotary shaft 112 is coupled to the operation member 110 via the rotation mechanism unit 130.

In the embodiment, an airbag storage unit 120 is fixed to the driver side (positive X-axis side) of the rotation mechanism unit 130. The airbag storage unit 120 is located in the center of the operation member 110 when the operation member 110 is viewed from the driver side. The airbag storage unit 120 stores an airbag therein in such a manner that the airbag can deploy. The airbag deploys by breaking through the airbag storage unit 120 in case of, e.g., a vehicle collision.

The rotation mechanism unit 130 is a device that rotates the support members 115 about a rotation axis (lateral axis Ab) extending in the lateral direction of the vehicle. The rotation mechanism unit 130 includes a rotation motor 131 configured to rotate the support members 115, etc. When the support members 115 are rotated about the lateral axis Ab by the driving force of the rotation mechanism unit 130, the operation member 110 supported by the support members 115 is also rotated about the lateral axis Ab accordingly.

The operation member 110 is rotated by the rotation mechanism unit 130 along with the operation of advancing or retracting the operation member 110. For example, when the operation mode of the steering system 100 is switched from the manual drive mode to the autonomous drive mode, the operation member 110 is stored in a storage area in a dashboard in front of the driver's seat. At this time, the operation member 110 is collapsed so as to be parallel to the steering axis Aa. When the operation mode of the steering system 100 is switched from the autonomous drive mode to the manual drive mode, the operation member 110 is returned to its normal position. At this time, the operation member 110 is rotated about the lateral axis Ab to an attitude perpendicular to the steering axis Aa. Advancing and retracting of the operation member 110 from and into the storage area will be described later with reference to FIG. 4, etc.

As shown in FIG. 2, the steering system 100 according to the embodiment further includes a switch holding unit 140 and a reaction force generating device 150 that are disposed on the front side (negative X-axis side) of the rotation mechanism unit 130. The switch holding unit 140 is a member that holds a switch configured to operate turn signals, etc., and the switch holding unit 140 is connected to a turn signal lever, etc. (not shown) that is operated by the driver.

The reaction force generating device 150 is a device that applies torque against the force from the driver to the operation member 110 when the driver operates the operation member 110 for steering. The reaction force generating device 150 includes the first actuator 151, etc. The reaction force generating device 150 is a device that reproduces as a reaction force, e.g., a force that is applied to an operation member during driving of a conventional vehicle in which tires (wheels) and the operation member are mechanically connected. That is, in the embodiment, one end of the rotary shaft 112 is fixed to the rotation mechanism unit 130, and the other end of the rotary shaft 112 inserted through the switch holding unit 140 is connected to the reaction force generating device 150. The reaction force generating device 150 applies the reaction force to the operation member 110 via the rotary shaft 112. The reaction force generating device 150 can also control the rotational position of the operation member 110 about the steering axis Aa. Specifically, for example, in the case where the operation member 110 is stored in the storage area when the operation mode of the steering system 100 is switched to the autonomous drive mode or when the vehicle is stopped, the operation member 110 is operated to a neutral rotational position in which the steered wheels 210 are in the straight ahead state. The first actuator 151 is used to rotate and drive the operation member 110 at this time. Synchronous control is performed when the operation member 110 is advanced from the storage area to the normal position. In the synchronous control, the rotational position of the operation member 110 is controlled to the rotational position corresponding to the steered angle of the steered wheels 210 at that time. The first actuator 151 is used to rotate and drive the operation member 110 during this synchronous control. An example of the operation of the steering system 100 during the synchronous control will be described later with reference to FIGS. 6A to 9.

The steering system 100 further includes a mechanism that changes the position of an integral mechanism unit composed of the operation member 110, the support members 115, the rotation mechanism unit 130, the switch holding unit 140, and the reaction force generating device 150. The distance between the operation member 110 and the driver can thus be changed.

Specifically, as shown in FIG. 2, the steering system 100 includes a moving unit 170 that moves the integral mechanism unit including the operation member 110 in the longitudinal direction (front-rear direction). In the embodiment, the moving unit 170 is a device that moves the operation member 110, etc. by a sliding mechanism. Specifically, the integral mechanism unit including the operation member 110 is supported by a base guide 161 via a movable body 162, and the movable body 162 is slidably held by the base guide 161. The base guide 161 is fixed to the vehicle via, e.g., brackets, not shown. As shown in FIG. 2, a slide drive shaft 173 is fixed to the base guide 161, and a body of the moving unit 170, which includes a slide motor 172, is moved along the slide drive shaft 173 by the driving force of the slide motor 172 of the moving unit 170. The movable body 162 connected to the body of the moving unit 170 is thus moved in the longitudinal direction along the base guide 161. As a result, the operation member 110, the rotation mechanism unit 130, etc. are moved in the longitudinal direction. The steering system 100 may include a tilt mechanism unit that changes the tilt of the integral mechanism unit including the operation member 110.

2-1. Basic Functional Configuration and Operation of Steering System

Figure 3:
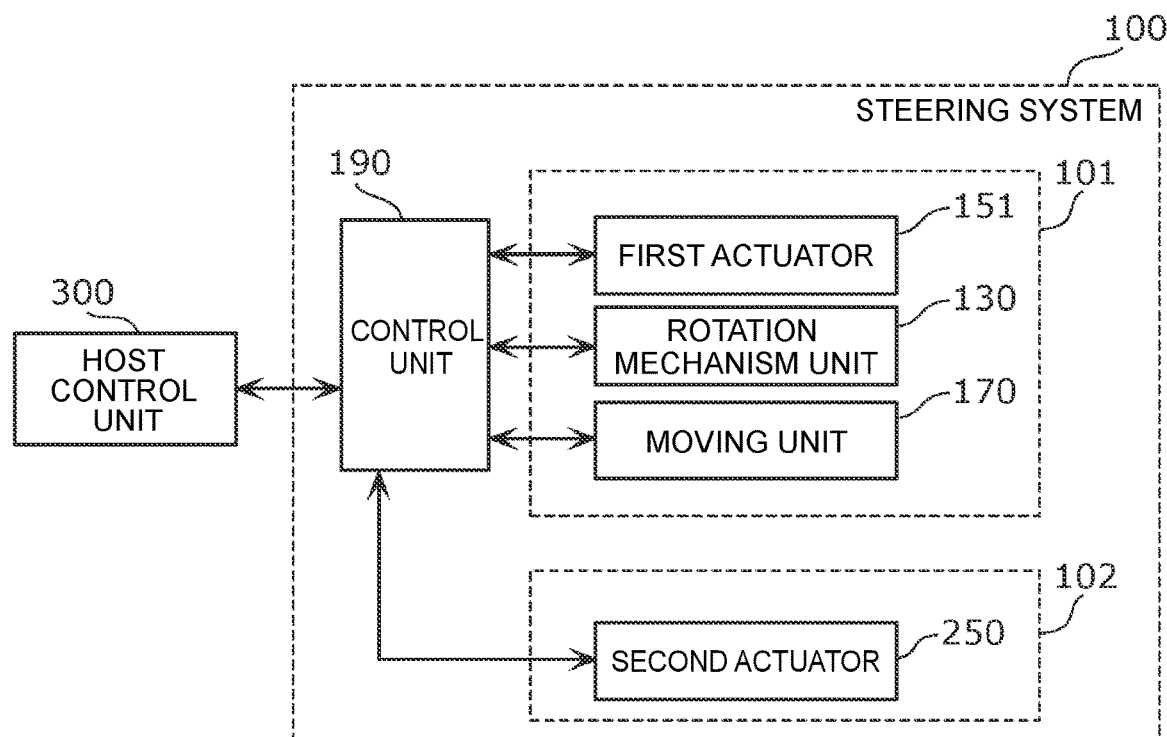
FIG. 3 is a block diagram illustrating a functional configuration of the steering system according to the embodiment.
Figure 4:
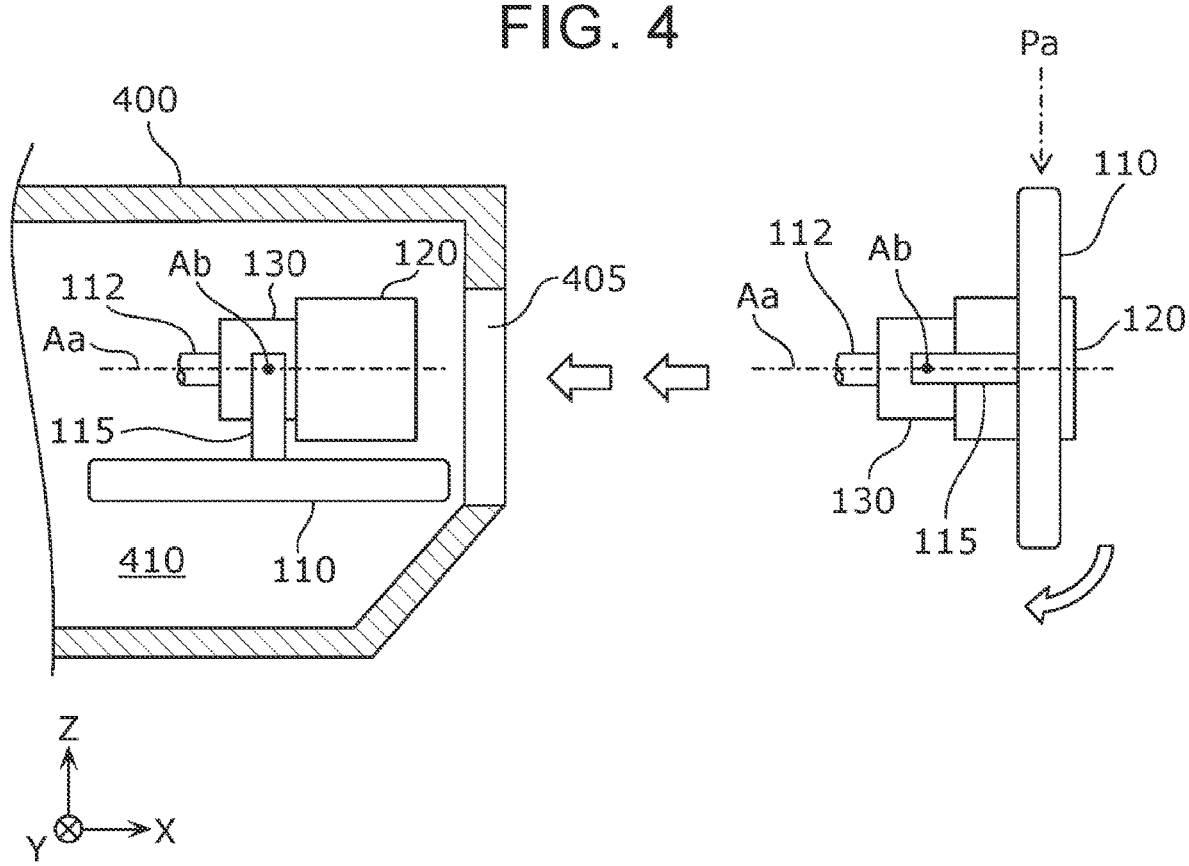
FIG. 4 illustrates operation that is performed when an operation member in the steering system according to the embodiment is retracted.
Figure 5A:
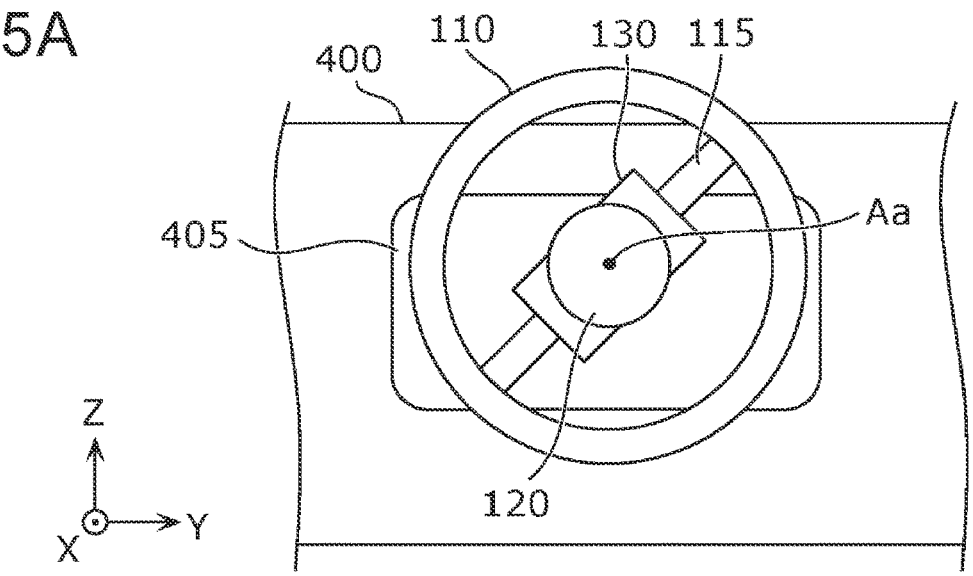
FIG. 5A illustrates an example of the rotational position of the operation member according to the embodiment when the operation member is at a normal position.
Figure 5B:
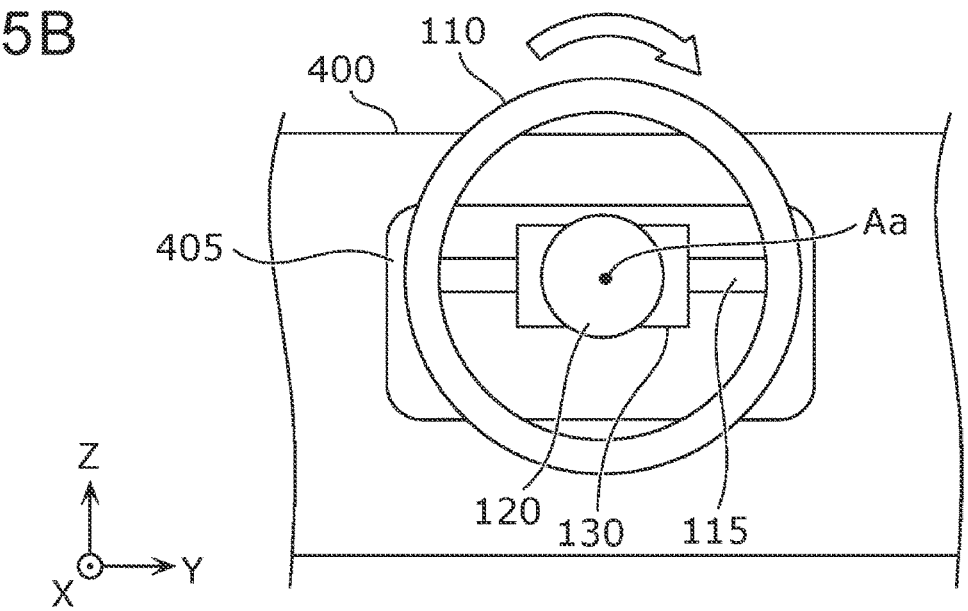
FIG. 5B illustrates an example of the rotational position of the operation member according to the embodiment when the operation member is stored in a storage area.
Figure 5C:
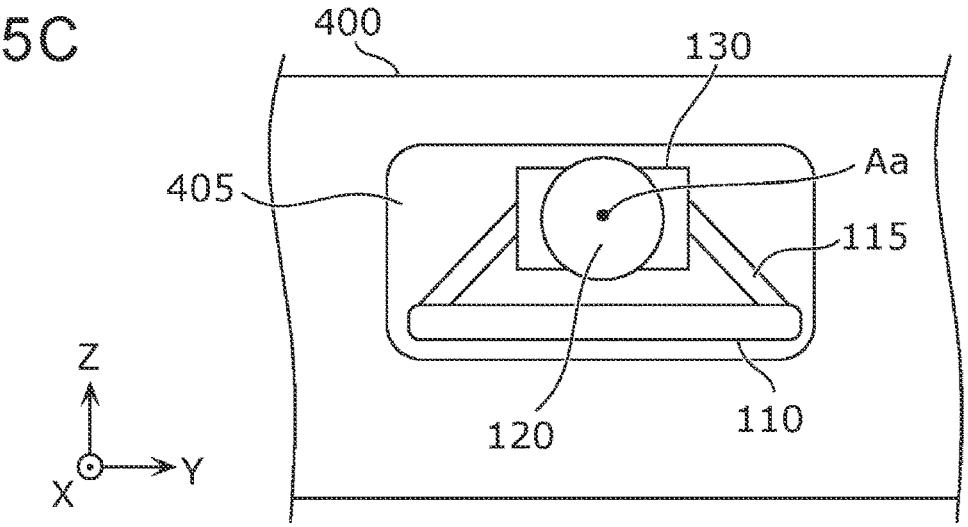
FIG. 5C illustrates an example of the attitude of the operation member according to the embodiment when the operation member is stored in the storage area.

The basic functional configuration and operation of the steering system 100 configured as described above will be described with reference to FIGS. 3 to 5C. FIG. 3 is a block diagram illustrating a functional configuration of the steering system 100 according to the embodiment. FIG. 4 illustrates the retracting operation of the operation member 110 in the steering system 100 according to the embodiment. FIG. 5A illustrates an example of the rotational position of the operation member 110 according to the embodiment when the operation member 110 is at a normal position Pa. FIG. 5B illustrates an example of the rotational position of the operation member 110 according to the embodiment when the operation member 110 is retracted. FIG. 5C illustrates an example of the attitude of the operation member 110 according to the embodiment when the operation member 110 is stored in a storage area 410.

In FIGS. 4 and 5A to 5C, only the operation member 110 and members located around the operation member 110 in the steering system 100 are illustrated for better understanding of the behavior of the operation member 110. In FIG. 4, a dashboard 400 is shown by a simple section in order to illustrate the storage area 410. This supplementary explanation regarding FIGS. 4 and 5A to 5C also applies to FIGS. 6A, 6B, 8, and 9 that will be described later.

As shown in FIG. 3, the steering system 100 includes the first actuator 151, the second actuator 250, a control unit 190, and the moving unit 170. As described above, the first actuator 151 is a device that applies a rotational driving force to the rotary shaft 112 (see FIG. 1), and the second actuator 250 is a device that applies a driving force for steering to the steered wheels 210 (see FIG. 1). As shown in FIG. 4, the moving unit 170 is a device that moves the operation member 110 between the normal position Pa that is a position where the operation member 110 is operated by the driver, and the storage area 410 located ahead of the normal position Pa.

The control unit 190 is a device that controls the operation of the steering system 100. Specifically, the control unit 190 can switch the operation mode of the steering system 100 from one of the autonomous drive mode and the manual drive mode to the other. For example, when the operation mode of the steering system 100 is switched from the autonomous drive mode to the manual drive mode, the control unit 190 controls the moving unit 170 to advance the operation member 110 stored in the storage area 410 to the normal position Pa shown in FIG. 4. When the operation mode of the steering system 100 is switched from the manual drive mode to the autonomous drive mode, the control unit 190 controls the moving unit 170 to store the operation member 110 located at the normal position Pa into the storage area 410 shown in FIG. 4. For example, the control unit 190 may perform the operation of advancing or retracting the operation member 110 according to an advance or retract instruction of the driver, which is sent due to, for example, a switch operation performed by the driver. The control unit 190 may perform the operation of advancing or retracting the operation member 110 when the following two conditions are satisfied. The two conditions include a condition that the control unit 190 switches the operation mode of the steering system 100 from one of the autonomous drive mode and the manual drive mode to the other, and a condition that the control unit 190 receives the advance or retract instruction from the driver. The normal position Pa does not need to be a fixed position and may be changed according to, e.g., the driver's preference.

The control unit 190 is implemented by a computer including, e.g., a central processing unit (CPU), a storage device such as a memory, an interface for inputting and outputting information, etc. For example, the control unit 190 can perform the operation control for the steering system 100 according to control signals sent from a host control unit 300, etc. in the vehicle, sensor detection results, etc. by the CPU executing a predetermined program stored in the storage device.

As described above, when the vehicle including the steering system 100 travels by autonomous driving, the operation member 110 is stored in the storage area 410. The space in front of the driver is thus increased. When manual driving is started in the vehicle or when manual driving is resumed, that is, when the vehicle is switched to manual driving, the operation member 110 is advanced to the normal position Pa. The driver can thus operate the operation member 110 to drive the vehicle.

In the embodiment, the storage area 410 is located inside the dashboard 400 that is an example of a vehicle member. The dashboard 400 has an opening 405 in its front surface, and the operation member 110 is advanced from and retracted into the storage area 410 through the opening 405.

For example, as shown in FIG. 5A, the opening 405 is not large enough to allow the operation member 110 and a group of members that moves with the operation member 110, such as the rotation mechanism unit 130, to be advanced from and retracted into the storage area 410 while they are kept in the same attitudes as those during manual driving. Accordingly, as shown in FIG. 4, the control unit 190 controls the rotation mechanism unit 130 to rotate the support members 115 about the lateral axis Ab to collapse the operation member 110. Specifically, the operation member 110 is rotated into an attitude parallel to the steering axis Aa.

At this time, for example, in the case where the rotational position of the operation member 110 is not the neutral rotational position as shown in FIG. 5A, the group of members including the operation member 110 cannot pass through the opening 405 even when the operation member 110 is collapsed. Accordingly, when the operation member 110 is to be stored in the storage area 410, the control unit 190 rotates the operation member 110 about the steering axis Aa to change the rotational position of the operation member 110 to the neutral rotational position, as shown in FIG. 5B. Specifically, the control unit 190 controls the first actuator 151 to rotate the rotary shaft 112 so that the rotational position of the operation member 110 matches the neutral rotational position. The control unit 190 can always acquire the rotation angle of the rotary shaft 112 using, for example, an encoder value of a motor of the first actuator 151. The control unit 190 can therefore always acquire the rotational position of the operation member 110.

The control unit 190 changes the rotational position of the operation member 110 to the neutral rotational position and controls the rotation mechanism unit 130 as shown in FIG. 5B to collapse the operation member 110 as shown in FIG. 5C. The control unit 190 also controls the moving unit 170 to store the operation member 110 in the storage area 410 as shown in FIG. 4. When the operation member 110 is returned from the storage area 410 to the normal position Pa, the control unit 190 controls the rotation mechanism unit 130 to move the operation member 110 to the attitude perpendicular to the steering axis Aa as shown in FIGS. 4 and 5B. Hereinafter, returning the collapsed operation member 110 (in the attitude parallel to the steering axis Aa) to the attitude perpendicular to the steering axis Aa is referred to as "deploying the operation member 110."

When the operation member 110 is stored in the storage area 410, the rotational position of the operation member 110 is fixed in order to avoid interference with an inner wall, etc. of the storage area 410. Specifically, the control unit 190 controls the first actuator 151 to control the rotation angle of the rotary shaft 112 coupled to the operation member 110 in order to keep the group of members including the operation member 110 in their attitudes shown in FIG. 4. This reduces rotation of the operation member 110 about the steering axis Aa due to, e.g., vibration during traveling, and as a result, reduces damage and abnormal noise due to the group of members including the operation member 110 interfering with the inner wall, etc. of the storage area 410. Moreover, for example, it is possible to avoid a situation where a load is caused on the first actuator 151 due to the first actuator 151 being operated in a state where the operation member 110 is non-rotatable.

When the operation member 110 is advanced from the storage area 410 toward the normal position Pa, the rotation angle of the rotary shaft 112 is fixed to the rotation angle at which the operation member 110 is stored in the storage area 410 so that the operation member 110 passes through the opening 405. Accordingly, when the operation member 110 is returned from the storage area 410 to the normal position Pa and is deployed, the rotational position of the operation member 110 may not correspond to the steered angle of the steered wheels 210. Specifically, there may be a case where the rotational position of the operation member 110 returned to the normal position Pa and deployed is, e.g., the neutral rotational position shown in FIG. 5B, although the rotational position of the operation member 110 corresponding to the steered angle of the steered wheels 210 at that time is the rotational position shown in FIG. 5A. Accordingly, the synchronous control is required to make the rotational position of the operation member 110 correspond to the steered angle of the steered wheels 210. As described above, the rotational position of the operation member 110 (the rotation angle of the rotary shaft 112) is fixed while the operation member 110 is stored in the storage area 410. The synchronous control therefore needs to be performed after the operation member 110 leaves the storage area 410. A specific example of this synchronous control will be described with reference to FIGS. 6A to 9.

2-2. Specific Example of Synchronous Control

FIG. 6A illustrates the operation member 110 according to the embodiment whose rotational position does not correspond to the steered angle of the steered wheels 210. FIG. 6B illustrates the operation member 110 according to the embodiment whose rotational position corresponds to the steered angle of the steered wheels 210.

For example, it is herein assumed that the steered angle of the steered wheels 210 is θ (≠0°) with respect to the straight ahead direction at the time when the operation member 110 advanced through the opening 405 to the outside of the storage area 410 is deployed, as shown in FIG. 6A. In this case, the steered wheels 210 do not face the straight ahead direction, while the operation member 110 is in the neutral rotational position, that is, the rotational position corresponding to the steered wheels 210 facing in the straight ahead direction. Accordingly, the control unit 190 controls the first actuator 151 to change the rotation angle of the rotary shaft 112. The control unit 190 thus changes the rotational position of the operation member 110 to the rotational position corresponding to the steered angle θ, as shown in FIG. 6B. The rotational position of the operation member 110 shown in FIG. 6B is the position of the operation member 110 rotated counterclockwise by φ with respect to the neutral rotational position. That is, in the synchronous control in this example, the rotary shaft 112 is rotated counterclockwise by φ by the first actuator 151. The control unit 190 thus performs the synchronous control by changing the rotation angle of the rotary shaft 112 to the angle corresponding to the steered angle of the steered wheels 210 driven by the second actuator 250. When the synchronous control is started while the vehicle is traveling in the automatic drive mode, the synchronous control is continued until the start of the operation of the operation member 110 by the driver is detected. That is, the rotational position of the operation member 110 changes according to the change in the steered angle of the steered wheels 210 during the automatic drive mode. Thus, the driver who intends to manually drive the vehicle can start manual driving without discomfort. The control unit 190 may not enable the operation of the operation member 110 by the driver until the synchronous control is completed. That is, the control unit 190 may keep a state where the operation of the operation member 110 by the driver is not accepted (keep the operation member disabled) until the synchronous control is completed.

The control unit 190 may perform the synchronous control after the movement of the operation member 110 to the normal position Pa is completed. In this case, the driver needs to wait for the completion of the movement of the operation member 110 to the normal position Pa and the completion of the subsequent synchronization control. The driver may hold the operation member 110 when the operation member 110 reaches the normal position Pa. In this case, for example, the start of the synchronous control may be delayed.

The steering system 100 according to the embodiment therefore performs, e.g., the operation shown in FIG. 7. FIG. 7 is a flowchart illustrating a basic operation flow of the steering system 100 according to the embodiment. As shown in FIG. 7, the control unit 190 operates the moving unit 170 based on, e.g., a predetermined operation performed by the driver or an instruction from the host control unit 300 (hereinafter referred to as the "predetermined operation, etc."). The operation member 110 thus starts to move (advance) rearward (S12). Thereafter, when a predetermined condition is satisfied in the period until the operation member 110 reaches the normal position Pa (Yes in S20), the control unit 190 starts the synchronous control (S40). That is, the synchronous control is started when the operation member 110 is located at an intermediate position, namely after the operation member 110 advances to the outside of the storage area 410 and before the operation member 110 reaches the normal position Pa.

As described above, the steering system 100 according to the embodiment includes the rotary shaft 112 to which the operation member 110 is coupled, the first actuator 151, the second actuator 250, the control unit 190, and the moving unit 170. The first actuator 151 applies a driving force for rotating the rotary shaft 112 to the rotary shaft 112. The second actuator 250 applies a driving force for steering to the steered wheels 210 that are not mechanically coupled to the rotary shaft 112, the steered wheels 210 being included in the vehicle. The control unit 190 controls the operation of the steering system 100. The moving unit 170 moves the operation member 110 between the normal position Pa that is a position where the operation member 110 is operated by the driver, and the storage area 410 located ahead of the normal position Pa. The control unit 190 can switch the operation mode of the steering system 100 between the manual drive mode and the autonomous drive mode. The manual drive mode is the operation mode in which the control unit 190 drives the second actuator 250 based on the operation of the operation member 110 by the driver when the operation member 110 is not in the storage area 410. The autonomous drive mode is the operation mode in which the control unit 190 drives the second actuator 250 based on an instruction generated without depending on the operation of the operation member 110 by the driver. When moving the operation member 110 from the storage area 410 to the normal position Pa, the control unit 190 starts the synchronous control when the operation member 110 satisfies the predetermined condition before the operation member 110 reaches the normal position Pa. In the synchronous control, the control unit 190 controls the first actuator 151 to change the rotation angle of the rotary shaft 112 to the angle corresponding to the steered angle of the steered wheels 210 driven by the second actuator 250.

With this configuration, when the vehicle including the steering system 100 is switched to manual driving, the synchronous control is started when the operation member 110 advanced to the outside of the storage area 410 satisfies some condition before it reaches the normal position Pa.

That is, in the case where the operation member 110 advances to the normal position Pa when the autonomous drive mode is switched to the manual drive mode while the vehicle is traveling or when the manual drive mode is started as the stopped vehicle starts to move, the synchronous control is started before the operation member 110 reaches the normal position Pa. Accordingly, for example, the synchronous control can be also completed before the operation member 110 reaches the normal position Pa. The driver can therefore operate the operation member 110 and start manual driving without discomfort when or immediately after the operation member 110 reaches the normal position Pa. As described above, with the steering system 100 of the embodiment, the space in front of the driver can be increased, and the vehicle can be efficiently switched to manual driving.

Figure 8:
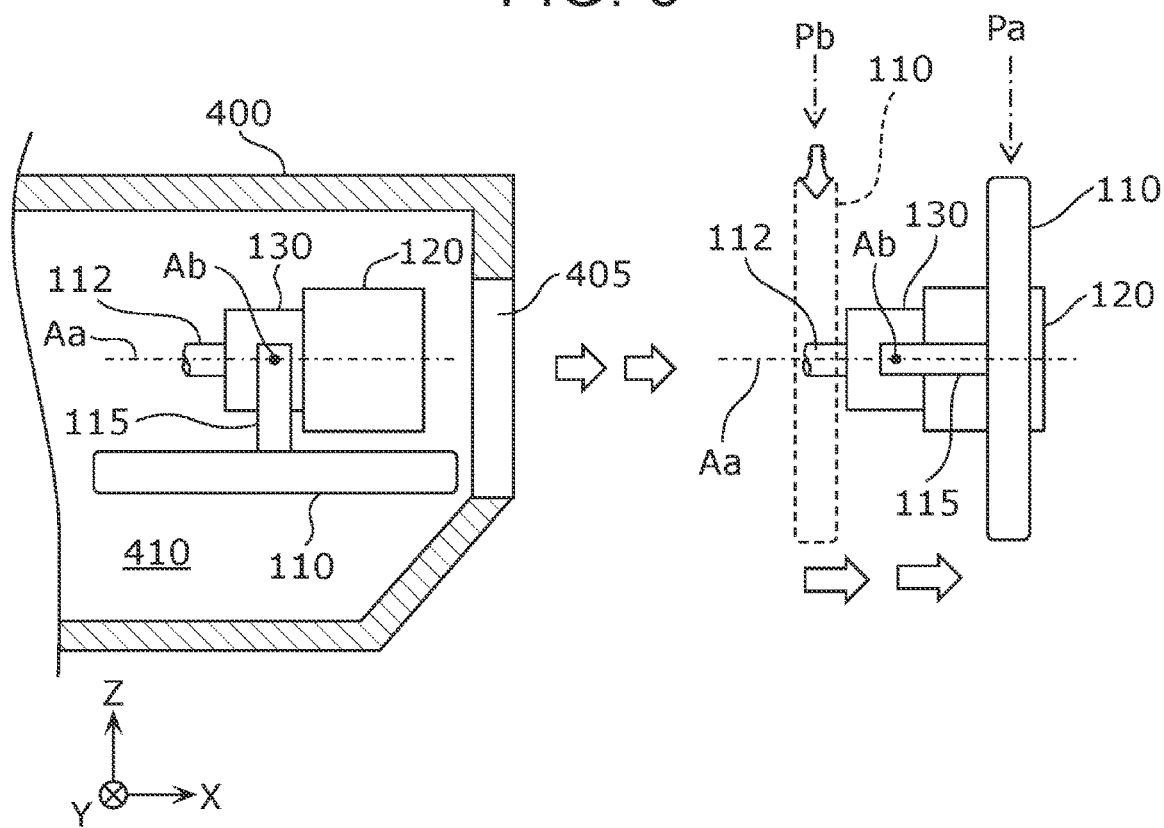
FIG. 8 illustrates a first example of the position where synchronous control is started in the steering system according to the embodiment.
Figure 9:
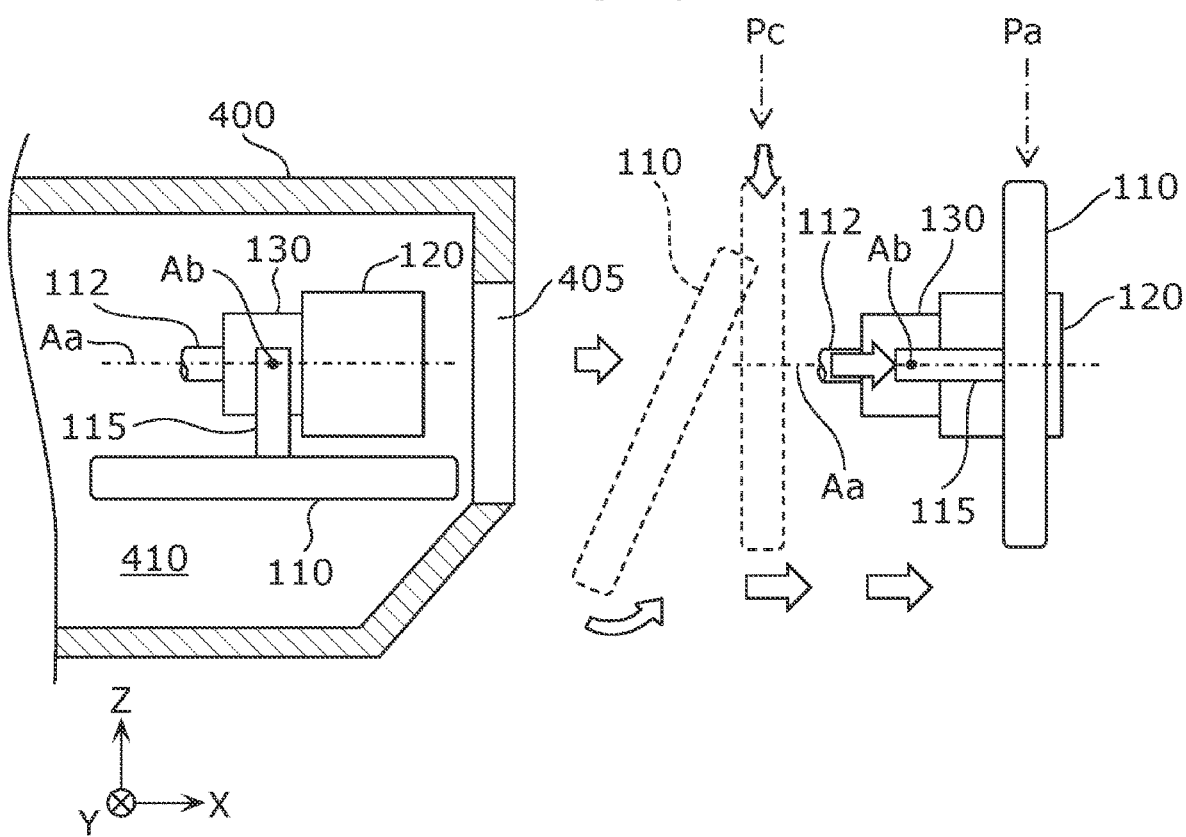
FIG. 9 illustrates a second example of the position where the synchronous control is started in the steering system according to the embodiment.

2-3. Specific Examples of Predetermined Condition for Starting Synchronous Control As described above, the control unit 190 starts the synchronous control when the operation member 110 satisfies the predetermined condition. Examples of the predetermined condition include conditions regarding the position or attitude of the operation member 110. Specific examples of the predetermined condition will be described with reference to FIGS. 8 and 9. FIG. 8 illustrates a first example of the position where the synchronous control is started in the steering system 100 according to the embodiment. FIG. 9 illustrates a second example of the position where the synchronous control is started in the steering system 100 according to the embodiment.

As shown in FIG. 8, in the steering system 100 according to the embodiment, the control unit 190 may start the synchronous control at a time when the operation member 110 reaches a predetermined position Pb. The time when the operation member 110 reaches the predetermined position Pb is a time when the operation member 110 satisfies the predetermined condition. That is, in this case, the predetermined condition is a condition that the operation member 110 reaches the predetermined position Pb.

Specifically, for example, the control unit 190 can detect the relative position of the operation member 110 with respect to a reference position, for example, by using an encoder value of the slide motor 172 of the moving unit 170, or by analyzing a captured image of the operation member 110. The position of the operation member 110 need not necessarily be detected by the control unit 190. For example, a position detection unit that acquires the encoder value of the slide motor 172 and outputs the relative position of the operation member 110 may be implemented by a dedicated device having a sensor, etc.

With this configuration, the control unit 190 can determine whether the control unit 190 should start the synchronous control for the rotational position of the operation member 110 by using a numerical value that can be relatively easily obtained (calculated), namely the longitudinal position of the operation member 110 (i.e., the position of the operation member 110 in the front-rear direction). For example, based on the maximum time required for the synchronous control and the speed at which the operation member 110 moves while advancing, the control unit 190 can calculate in advance the predetermined position Pb, which is the position where the synchronous control is started, so that the synchronous control is completed by the time the operation member 110 reaches the normal position Pa. That is, the control unit 190 can efficiently switch the vehicle to manual driving by relatively easy information processing.

Whether the operation member 110 has reached the predetermined position Pb need not necessarily be determined by comparison between the position of the operation member 110 itself and the predetermined position Pb. For example, whether the operation member 110 has reached the predetermined position Pb may be determined by comparison between the position of another member such as the rotary shaft 112 or the rotation mechanism unit 130 that moves with the operation member 110 and a predetermined position of the other member corresponding to the predetermined position Pb.

As shown in FIG. 9, in the steering system 100 according to the embodiment, the control unit 190 may start the synchronous control at a time when the rotational position of the operation member 110 about the lateral axis Ab (see FIG. 2) reaches a predetermined rotational position. The time when the rotational position of the operation member 110 about the lateral axis Ab reaches the predetermined rotational position is a time when the operation member 110 satisfies the predetermined condition. That is, in this case, the predetermined condition is a condition that the rotational position of the operation member 110 about the lateral axis Ab reaches the predetermined rotational position.

Specifically, the control unit 190 can detect the rotational position of the operation member 110 about the lateral axis Ab, for example, by using an encoder value of the rotation motor 131 of the rotation mechanism unit 130, or by analyzing a captured image of the operation member 110. The rotational position of the operation member 110 about the lateral axis Ab need not necessarily be detected by the control unit 190. For example, a rotational position detection unit that acquires the encoder value of the rotation motor 131 and outputs the rotational position of the operation member 110 about the lateral axis Ab may be implemented by a dedicated device having a sensor, etc.

In the embodiment, as described above, the control of deploying the collapsed operation member 110 is performed when the operation member 110 stored in the storage area 410 is moved to the normal position Pa. Specifically, the control unit 190 controls the rotation mechanism unit 130 at a position where the operation member 110 that advances to the outside of the storage area 410 through the opening 405 does not interfere with, e.g., the dashboard 400. The control unit 190 thus starts deployment of the operation member 110 and then completes the deployment. The position of the operation member 110 at the completion of the deployment is a predetermined position Pc located ahead of the normal position Pa. That is, the steering system 100 can complete the deployment of the operation member 110 before the operation member 110 reaches the normal position Pa.

In the steering system 100 according to the embodiment, the synchronous control can be started, e.g., at the completion of the deployment of the operation member 110. That is, once the operation member 110 is advanced to the outside of the storage area 410 and the deployment of the operation member 110 is completed, the operation member 110 does not interfere with another member such as the dashboard 400 even when the operation member 110 is rotated about the steering axis Aa. The control unit 190 can therefore reliably and efficiently perform the synchronous control.

The control unit 190 may perform the synchronous control when the rotational position of the operation member 110 about the lateral axis Ab reaches a predetermined rotational position before the completion of the deployment of the operation member 110. For example, the predetermined rotational position may be the position immediately after the deployment of the operation member 110 is started.

Based on the maximum time required for the synchronous control and the speed at which the operation member 110 is deployed, the predetermined rotational position may be determined so that the synchronous control is completed by the time the deployment of the operation member 110 is completed. In this case, for example, the synchronous control can be completed at or before the completion of the deployment of the operation member 110. The driver can thus start manual driving based on a simple criterion that is visually easy to see, namely at the completion of the deployment of the operation member 110.

Whether the rotational position of the operation member 110 has reached the predetermined rotational position need not necessarily be determined by comparison between the rotational position of the operation member 110 itself about the lateral axis Ab and the predetermined rotational position. For example, whether the rotational position of the operation member 110 about the lateral axis Ab has reached the predetermined rotational position may be determined by comparison between the rotational position about the lateral axis Ab of another member such as the support members 115 that is rotated with the operation member 110 about the lateral axis Ab and a predetermined position of the other member.

As described above, the steering system 100 according to the embodiment includes the first actuator 151 that functions as a rotation fixing unit that fixes the rotational position of the operation member 110 to a predetermined rotational position. The control unit 190 may start the synchronous control at a time when the first actuator 151 stops fixing the rotational position of the operation member 110 (the rotation angle of the rotary shaft 112). The time when the first actuator 151 stops fixing the rotational position of the operation member 110 (i.e., the rotation angle of the rotary shaft 112) is a time when the operation member 110 satisfies the predetermined condition. In this case, the predetermined condition is a condition that the first actuator 151 stops fixing the rotational position of the operation member 110 (i.e., the rotation angle of the rotary shaft 112). That is, the control unit 190 can operate the first actuator 151 as the rotation fixing unit by performing fixing control, namely by controlling the first actuator 151 so that the rotational position of the operation member 110 matches a predetermined rotational position. In this case, the control unit 190 can stop fixing the rotational position by finishing the fixing control.

Specifically, when the operation member 110 is rotated around the steering axis Aa, other members such as the rotation mechanism unit 130 and the switch holding unit 140 are also rotated in addition to the operation member 110. The group of members including the operation member 110 is not circular as viewed in the direction of the steering axis Aa. Accordingly, when the rotational position of the operation member 110 is fixed in the storage area 410, the group of members does not interfere with the dashboard 400. However, when the rotational position of the operation member 110 is changed in the storage area 410, the group of members may interfere with the dashboard 400.

For example, the control unit 190 therefore stops fixing the rotational position of the operation member 110 when the entire group of members including the operation member 110 has passed through the opening 405 of the dashboard 400 to the outside of the storage area 410. As a result, even when the group of members including the operation member 110 is rotated around the steering axis Aa after the control unit 190 stops fixing the rotational position, the group of members does not interfere with other members such as the dashboard 400. That is, the control unit 190 stops fixing the rotational position of the operation member 110 (stops fixing the rotation angle of the rotary shaft 112) and starts the synchronous control. The control unit 190 can thus reliably and efficiently complete the synchronous control without causing interference of the operation member 110 with other members such as the dashboard 400.

The first actuator 151 need not necessarily function as the rotation fixing unit. The steering system 100 may include, e.g., a lock mechanism unit that moves a member that engages with the rotary shaft 112 in the circumferential direction, in accordance with the control performed by the control unit 190. In this case, the lock mechanism unit can have the function of the rotation fixing unit to fix and stop fixing the rotation angle of the rotary shaft 112.

Other Embodiments

The steering system according to the disclosure is described above based on the embodiment. However, the disclosure is not limited to the above embodiment. Various modifications that can be made to the above embodiment by those skilled in the art and forms using any combination of two or more of the components described above without departing from the scope of the disclosure are within the scope of the disclosure.

For example, the steering system 100 need not necessarily include the rotation mechanism unit 130. That is, advancing and retracting of the operation member 110 need not necessarily involve rotation of the operation member 110 about the lateral axis Ab extending in the lateral direction of the vehicle. The operation member 110 can still be stored in the storage area 410 formed, for example, in the dashboard 400 in front of the driver's seat. In this case, the storage area 410 (opening 405) that is formed, for example, in the dashboard 400 in front of the driver's seat has a shape or size corresponding to the shape or size of the operation member 110 so that the operation member 110 can be stored in the storage area 410 while kept in the same attitude as that during manual driving. When the operation member 110 is stored in the storage area 410, a member that supports the operation member 110 and that is non-circular as viewed in the direction of the steering axis Aa may also be stored in the storage area 410. Moreover, the operation member 110 may not be perfectly round and be non-circular as viewed in the direction of the steering axis Aa. In these cases, the rotational position of the operation member 110 when stored is limited. Accordingly, the rotational position of the operation member 110 at the time when the operation member 110 is advanced from the storage area 410 may not match the steered angle of the steered wheels 210 at that time. Accordingly, in this case as well, the synchronous control for the rotational position of the operation member 110 is necessary when the operation member 110 is advanced to the normal position Pa. Regardless of the presence or absence of the rotation mechanism unit 130, starting the synchronous control before the operation member 110 reaches the normal position Pa is therefore useful for efficient switching to manual driving. Moreover, it is not necessary for the storage area 410 (opening 405) to have such a size and shape that the storage area 410 (opening 405) can store a non-circular member whose rotational position about the steering axis Aa is undetermined. Accordingly, the storage area 410 (opening 405) can be made relatively small.

The function of the control unit 190 to control the steering mechanism unit 101 including the first actuator 151, etc. and the function of the control unit 190 to control the steering operation mechanism unit 102 including the second actuator 250, etc. may be implemented by separate computers. That is, the control unit 190 according to the embodiment may be implemented by a first control unit that controls the steering mechanism unit 101, a second control unit that controls the steering operation mechanism unit 102, and a main control unit that controls the first control unit and the second control unit. The first control unit may have a function to control the second control unit. That is, the control unit 190 according to the embodiment may be implemented by the first control unit and the second control unit. The configuration of hardware and software for controlling the steering system 100 is not particularly limited, and the arrangement thereof is also not particularly limited.

The mechanism configured to move the operation member 110 in the longitudinal direction need not necessarily be the sliding mechanism. For example, the operation member 110 may be moved between the storage area and the normal position Pa by collapsing and deploying an arm with one or more joints that integrally supports the mechanism unit including the operation member 110, etc.

For example, a shutter that automatically opens and closes when the operation member 110 is advanced and retracted may be provided in the opening 405 that is the entrance and exit to and from the storage area 410. In this case, the operation member 110 can be completely hidden during, e.g., autonomous driving, and the shutter can function as a part of a wall forming a vehicle cabin. By storing the operation member 110 in the storage area 410 when the vehicle is stopped, the operation member 110 is hidden by the shutter, which improves the anti-theft effect of the vehicle.

The operation member 110 need not necessarily have such an annular shape as shown in FIG. 1. For example, the operation member 110 may have a U-shape or an H-shape that lacks a part of its upper end and/or lower end, etc. in FIG. 2. That is, the shape and size of the operation member 110 are not particularly limited as long as the driver can hold the operation member 110 in the manual drive mode in such a manner that he or she can drive the vehicle.

The disclosure is useful as a steering system capable of increasing the space in front of the driver and efficiently switching to manual driving. The disclosure is therefore applicable to vehicles including wheels, continuous tracks, or the like, such as passenger vehicles, buses, trucks, agricultural machines, and construction equipment, the vehicles being capable of being manually driven and autonomously driven.

What is claimed is:

1. A steering system configured to steer a vehicle, the steering system comprising:
    a rotary shaft to which an operation member is coupled;
    a first actuator configured to apply to the rotary shaft a driving force for rotating the rotary shaft;
    a second actuator configured to apply a driving force for steering to steered wheels that are not mechanically coupled to the rotary shaft, the steered wheels being included in the vehicle;
    a control unit configured to control operation of the steering system; and
    a moving unit configured to move the operation member between a normal position, which is a position where the operation member is operated by a driver, and a storage area located ahead of the normal position,
    wherein the control unit is configured to switch between a manual drive mode and an autonomous drive mode, the manual drive mode being a mode in which the control unit drives the second actuator based on operation of the operation member by the driver when the operation member is not in the storage area, and the autonomous drive mode being a mode in which the control unit drives the second actuator based on an instruction that is generated without depending on the operation of the operation member by the driver, and
    wherein the control unit is configured to, during movement of the operation member from the storage area to the normal position and when the operation member satisfies a predetermined condition during the movement, start synchronous control before the operation member reaches the normal position, the synchronous control being control in which the control unit controls the first actuator to change a rotation angle of the rotary shaft to an angle corresponding to a steered angle of the steered wheels driven by the second actuator.

2. The steering system according to claim 1, wherein:
    the control unit is configured to start the synchronous control at a time when the operation member reaches a predetermined position; and
    the time when the operation member reaches the predetermined position is a time when the operation member satisfies the predetermined condition.

3. The steering system according to claim 1, further comprising:
    a support member configured to support the operation member; and
    a rotation mechanism unit configured to rotate the support member about a lateral axis extending in a lateral direction of the vehicle,
    wherein the control unit is configured to start the synchronous control at a time when a rotational position of the operation member about the lateral axis reaches a predetermined rotational position, and
    wherein the time when the rotational position of the operation member about the lateral axis reaches the predetermined rotational position is a time when the operation member satisfies the predetermined condition.

4. The steering system according to claim 1, further comprising
    a rotation fixing unit that fixes a rotational position of the operation member to a predetermined rotational position,
    wherein the control unit is configured to start the synchronous control at a time when the rotation fixing unit stops fixing the rotational position, and
    wherein the time when the rotation fixing unit stops fixing the rotational position is a time when the operation member satisfies the predetermined condition.

5. The steering system according to claim 4, wherein the control unit is configured to operate the first actuator as the rotation fixing unit by performing fixing control and to stop fixing the rotational position by finishing the fixing control, the fixing control being control in which the control unit controls the first actuator to make the rotational position of the operation member match the predetermined rotational position.

* * * * *